(12) United States Patent
Liu

(10) Patent No.: US 11,719,991 B2
(45) Date of Patent: Aug. 8, 2023

(54) OPTICAL PANEL, IMAGE COLLECTION DEVICE AND IMAGE COLLECTION METHOD

(71) Applicant: Lenovo (Beijing) Co., Ltd., Beijing (CN)

(72) Inventor: Lei Liu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 126 days.

(21) Appl. No.: 17/206,710

(22) Filed: Mar. 19, 2021

(65) Prior Publication Data
US 2021/0405494 A1 Dec. 30, 2021

(30) Foreign Application Priority Data
Jun. 30, 2020 (CN) .......................... 202010624026.9

(51) Int. Cl.
*G02F 1/163* (2006.01)
*G02F 1/155* (2006.01)
(Continued)

(52) U.S. Cl.
CPC .............. *G02F 1/163* (2013.01); *G02F 1/155* (2013.01); *G02F 1/161* (2013.01); *H04N 23/75* (2023.01); *G02F 2001/1536* (2013.01)

(58) Field of Classification Search
CPC .......... G02F 1/163; G02F 1/155; G02F 1/161; G02F 2001/1536; G02F 2201/123;
(Continued)

(56) References Cited

U.S. PATENT DOCUMENTS 6,631,022 B1 * 10/2003 Kihira ..................... G02F 1/155
348/E5.04
8,300,111 B2 * 10/2012 Iwane ..................... H04N 5/238
348/221.1
(Continued)

FOREIGN PATENT DOCUMENTS

CN 209182633 U 7/2019
CN 110794634 A 2/2020
(Continued)

*Primary Examiner* — Jason A Flohre
(74) *Attorney, Agent, or Firm* — Anova Law Group, PLLC

(57) ABSTRACT

An optical panel includes a first transparent substrate, a second transparent substrate, an electrochromic assembly, a first transparent electrode layer, and a second transparent electrode layer. The second transparent substrate is arranged opposite the first transparent substrate. The electrochromic assembly is located between the first transparent substrate and the second transparent substrate and includes a plurality of electrochromic pixel-units that are arranged in an array. A shielding and spacing wall is arranged between two adjacent of the plurality of electrochromic pixel-units. The first transparent electrode layer is arranged between the electrochromic assembly and the first transparent substrate. The second transparent electrode layer is arranged between the electrochromic assembly and the second transparent substrate. The first transparent electrode layer and the second transparent electrode layer are configured to provide a driving voltage to the plurality of electrochromic pixel-units to adjust an optical parameter of the plurality of electrochromic pixel-units.

16 Claims, 5 Drawing Sheets

(51) Int. Cl.
G02F 1/161 (2006.01)
H04N 23/75 (2023.01)
G02F 1/153 (2006.01)

(58) Field of Classification Search
CPC ...... G02F 2203/48; G02F 1/153; G02F 1/157; G02F 1/1525; H04N 5/238; H04N 5/232; H04N 5/2254; H04N 5/2251; H04N 23/75; H04N 23/55; H04N 23/60; H04N 23/50; G03B 30/00; G03B 7/28; G03B 11/00

See application file for complete search history.

(56) References Cited

U.S. PATENT DOCUMENTS

| | | | | |
|---|---|---|---|---|
| 9,307,158 | B2* | 4/2016 | Gleason | H04N 5/2254 |
| 2002/0012064 | A1* | 1/2002 | Yamaguchi | H04N 5/238 |
| | | | | 348/E5.04 |
| 2003/0020827 | A1* | 1/2003 | Bean | H04N 5/238 |
| | | | | 348/E5.04 |
| 2003/0214479 | A1* | 11/2003 | Matsuda | G02F 1/167 |
| | | | | 345/107 |
| 2008/0304819 | A1* | 12/2008 | Tolbert | H04N 5/2251 |
| | | | | 396/448 |
| 2010/0134865 | A1* | 6/2010 | Higuchi | G02F 1/163 |
| | | | | 359/273 |
| 2011/0043885 | A1* | 2/2011 | Lamine | G02F 1/155 |
| | | | | 359/275 |
| 2012/0105692 | A1* | 5/2012 | Ackerson | H01L 27/14623 |
| | | | | 257/E31.127 |
| 2012/0120477 | A1* | 5/2012 | Biver | G02F 1/155 |
| | | | | 359/275 |
| 2014/0049805 | A1* | 2/2014 | Gu | G02F 1/155 |
| | | | | 359/266 |
| 2017/0085765 | A1* | 3/2017 | Choi | G02F 1/13318 |
| 2017/0123575 | A1* | 5/2017 | Evans, V | G06F 1/1643 |
| 2019/0163020 | A1* | 5/2019 | Ikeno | G02F 1/133606 |
| 2020/0260026 | A1* | 8/2020 | Ono | H01L 27/14645 |
| 2021/0006701 | A1* | 1/2021 | Sakurabu | G02B 7/28 |
| 2021/0091147 | A1* | 3/2021 | Liu | H01L 51/5206 |
| 2022/0174764 | A1* | 6/2022 | Huang | G02B 27/017 |

FOREIGN PATENT DOCUMENTS

| | | |
|---|---|---|
| CN | 210038406 U | 2/2020 |
| KR | 20030030605 A | 4/2003 |

* cited by examiner

OPTICAL PANEL, IMAGE COLLECTION DEVICE AND IMAGE COLLECTION METHOD

CROSS-REFERENCE TO RELATED APPLICATION

This application claims priority to Chinese Patent Application No. 202010624026.9, filed on Jun. 30, 2020, the entire content of which is incorporated herein by reference.

TECHNICAL FIELD

The present disclosure generally relates to the image collection apparatus technology field and, more particularly, to an optical panel, an image collection apparatus, and an image collection method.

BACKGROUND

As scientific technology continues to develop, an image collection apparatus is broadly used in daily life and brings great convenience. The image collection apparatus has become an important tool.

To achieve more variety of photographing effects, for an apparatus configured to collect images, such as a single-lens reflex (SLR) camera, image collection of different scenes can be realized by using a professional external apparatus. For example, a professional neutral-density (ND) filter is equipped for a lens to realize photographing operation with a long time exposure, or a gradient filter is equipped for the lens to realize the photographing operation of a scenery film.

For a mobile terminal integrated with an image collection function, such as a cellphone, a tablet, and a wearable apparatus, the image collection function is only one of a plurality of functions. Compared to the SLR camera, a relatively large gap exists for the variety of photographing effects of the mobile terminal. To achieve the variety of photographing effects, the mobile terminal usually applies a back-end algorithm. However, photographing quality achieved by using the back-end algorithm is poor.

SUMMARY

Embodiments of the present disclosure provide an optical panel including a first transparent substrate, a second transparent substrate, an electrochromic assembly, a first transparent electrode layer, and a second transparent electrode layer. The second transparent substrate is arranged opposite the first transparent substrate. The electrochromic assembly is located between the first transparent substrate and the second transparent substrate and includes a plurality of electrochromic pixel-units that are arranged in an array. A shielding and spacing wall is arranged between two adjacent of the plurality of electrochromic pixel-units. The first transparent electrode layer is arranged between the electrochromic assembly and the first transparent substrate. The second transparent electrode layer is arranged between the electrochromic assembly and the second transparent substrate. The first transparent electrode layer and the second transparent electrode layer are configured to provide a driving voltage to the plurality of electrochromic pixel-units to adjust an optical parameter of the plurality of electrochromic pixel-units.

Embodiments of the present disclosure provide an image collection apparatus, including a camera module, an optical panel, and a processor. The optical panel is arranged on a light incident side of the camera module and includes a first transparent substrate, a second transparent substrate, an electrochromic assembly, a first transparent electrode layer, and a second transparent electrode layer. The second transparent substrate is arranged opposite the first transparent substrate. The electrochromic assembly is located between the first transparent substrate and the second transparent substrate and includes a plurality of electrochromic pixel-units that are arranged in an array. A shielding and spacing wall is arranged between two adjacent of the plurality of electrochromic pixel-units. The first transparent electrode layer is arranged between the electrochromic assembly and the first transparent substrate. The second transparent electrode layer is arranged between the electrochromic assembly and the second transparent substrate. The processor is configured to provide a driving voltage for the optical panel and control the camera module to perform photosensitive imaging.

Embodiments of the present disclosure provide an image collection method. The method includes providing a first driving voltage to an optical panel to obtain a first image through a camera module, dividing the first image into a plurality of image regions, and providing a second driving voltage to the optical panel to obtain a second image through the camera module. The first driving voltage causes all electrochromic pixel-units of the optical panel to have a largest light transmittance. The second driving voltage causes the light transmittance of the electrochromic pixel-units to be negatively correlated to the brightness level of the plurality of image regions.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

Embodiments of the present disclosure are described in detail in connection with the accompanying drawings below.

Described embodiments are merely some embodiments of the present disclosure but not all embodiments. Based on embodiments of the present disclosure, all other embodiments obtained by those of ordinary skill in the art without creative effort should be within the scope of the present disclosure.

A mobile terminal integrated with an image collection function, such as a cell phone, a tablet, and a wearable apparatus may realize a variety of photographing effects by a back-end algorithm. Imaging quality can be poor.

By arranging a filter to a camera of the mobile terminal, the imaging quality may be improved. To realize the variety of photographing effects, different types of filters may be arranged, which is not convenient to use and has a high cost.

Embodiments of the present disclosure provide an optical panel. The optical panel may be used as a cover panel of a camera module in the image collection apparatus, which may not increase the volume of the camera module. With an electrochromic property of an electrochromic assembly, incident light may be adjusted to realize a variety of photographing effects. Moreover, the image quality is good. In the optical panel, a shielding and spacing wall may be arranged between adjacent electrochromic pixel-units of the electrochromic assembly. Thus, electric field crosstalk between adjacent electrochromic pixel-units may be prevented, and accuracy of light adjustment is relatively good.

To make the purposes, characteristics, and advantages easy to understand, the present disclosure is further described in detail in connection with the accompanying drawings and specific embodiments.

Figure 1:
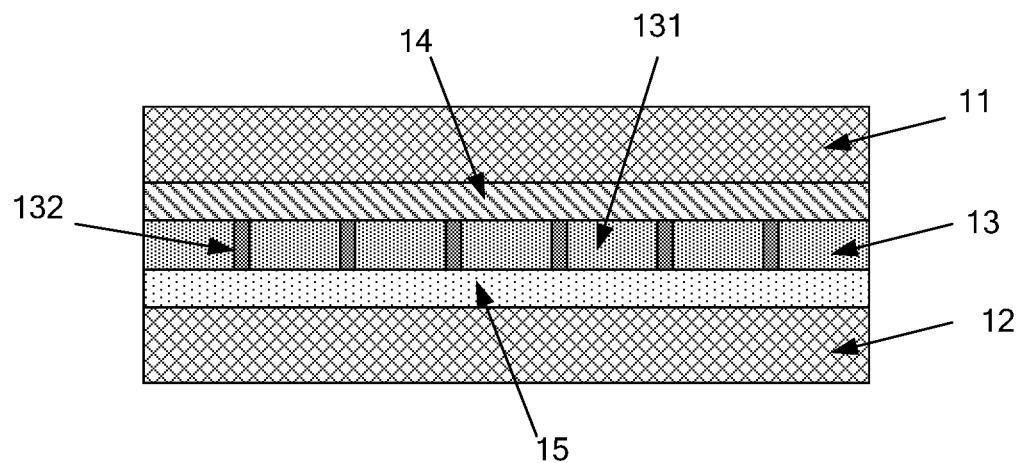
FIG. 1 illustrates a schematic diagram of an optical panel according to some embodiments of the present disclosure.

FIG. 1 illustrates a schematic diagram of an optical panel according to some embodiments of the present disclosure. The optical panel includes a first transparent substrate 11, a second transparent substrate 12, an electrochromic assembly 13, a first transparent electrode layer 14, and a second transparent electrode layer 15. The first transparent substrate 11 and the second transparent substrate 12 are arranged oppositely. The electrochromic assembly 13 is located between the first transparent substrate 11 and the second transparent substrate 12. The electrochromic assembly 13 includes a plurality of electrochromic pixel-units 131 arranged in arrays. A transparent shielding and spacing wall 132 is arranged between two adjacent electrochromic pixel-units 131. The first transparent electrode layer 14 is arranged between the electrochromic assembly 13 and the first transparent substrate 11. The second transparent electrode layer 15 is arranged between the electrochromic assembly 13 and the second transparent substrate 12. The first transparent electrode layer 14 and the second transparent electrode layer 15 are configured to provide a driving voltage to the electrochromic pixel-units 131 to adjust an optical parameter of the electrochromic pixel-units 131. The optical parameter includes light transmittance and/or display color.

A processor connected to the first transparent electrode layer 14 and the second transparent electrode layer 15 may provide the driving voltage to the two transparent electrode layers to control the electrochromic pixel-unit arrays. Thus, the incident light may be controlled through hardware to adjust an imaging effect and increase imaging quality.

The optical panel of embodiments of the present disclosure may be used as the cover panel of the camera module of the image collection apparatus, which may not increase the volume of the camera module. With the electrochromic characteristic of the electrochromic assembly 13, the incident light may be adjusted to realize the variety of photographing effects, and the imaging quality may be good. In the optical panel, the shielding and spacing wall 132 is arranged between the adjacent electrochromic pixel-units 131 of the electrochromic assembly 13. The shielding and spacing wall 132 may prevent the electrical field crosstalk between the adjacent electrochromic pixel-units 131. The accuracy of the light adjustment may be good.

Figure 2:
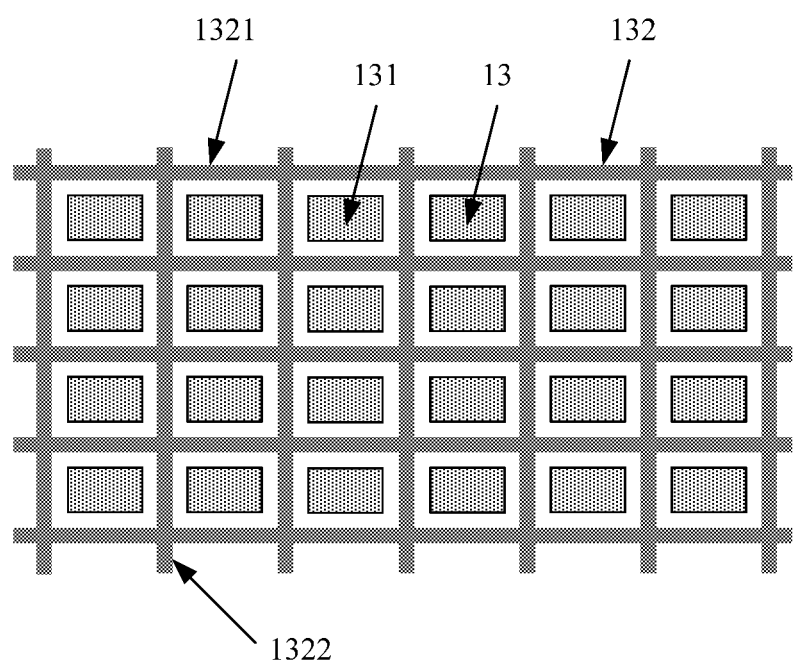
FIG. 2 illustrates a schematic structural diagram showing a shielding and spacing wall of the optical panel according to some other embodiments of the present disclosure.

FIG. 2 illustrates a schematic structural diagram showing a shielding and spacing wall of the optical panel according to some other embodiments of the present disclosure. The shielding and spacing wall 132 includes a transparent conductive layer. The transparent conductive layer includes a plurality of first shielding and spacing walls 1321 arranged parallelly and a plurality of second shielding and spacing walls 1322 arranged parallelly. The plurality of first shielding and spacing walls 1321 intersect the plurality of second shielding and spacing walls 1322 to form a plurality of pixel areas. The pixel areas are corresponding to the electrochromic pixel-units 131. Each of the electrochromic pixel-units 131 is located in a pixel area.

As shown in FIG. 2, the shielding and spacing wall 132 is arranged between any two adjacent electrochromic pixel-units 131. Each of the electrochromic pixel-unit 131 is surrounded by the shielding and spacing walls 132. In some embodiments, the shielding and spacing walls 132 may not be arranged around the furthest outer sides of the arrays.

The shielding and spacing wall may be a patterned transparent conductive layer, which may not affect the light transmittance of the optical panel. The transparent conductive layer may include indium tin oxide (ITO) or another transparent conductive layer.

The transparent conductive layer having a structure shown in FIG. 2 may be formed by mask evaporation. In some other embodiments, a front transparent conductive layer may be formed first, and then, the transparent conductive layer shown in FIG. 2 may be formed by etching.

The first shielding and spacing wall 1321 and the second shielding and spacing wall 1322 may be arranged perpendicular to each other and prepared by a same transparent conductive layer. the electrochromic assembly 13 includes the plurality of electrochromic pixel-units 131 arranged in arrays. The first shielding and spacing walls 1321 are parallel to a row direction of the arrays. The second shielding and spacing walls 1322 are parallel to a column direction of the arrays. As such, the first shielding and spacing walls 1321 and the second shielding and spacing walls 1322 intersect perpendicularly to each other to form the plurality of pixel areas arranged in arrays. Each pixel area includes an electrochromic pixel-unit 131.

The first shielding and spacing walls 1321 and the second shielding and spacing walls 1322 are located in a same transparent conductive layer. Thus, the first shielding and spacing walls 1321 and the second shielding and spacing walls 1322 are electrically and integrally connected at an intersection position. The transparent conductive layer may be grounded. Thus, the first shielding and spacing walls 1321 and the second shielding and spacing walls 1322 are grounded.

Figure 3:
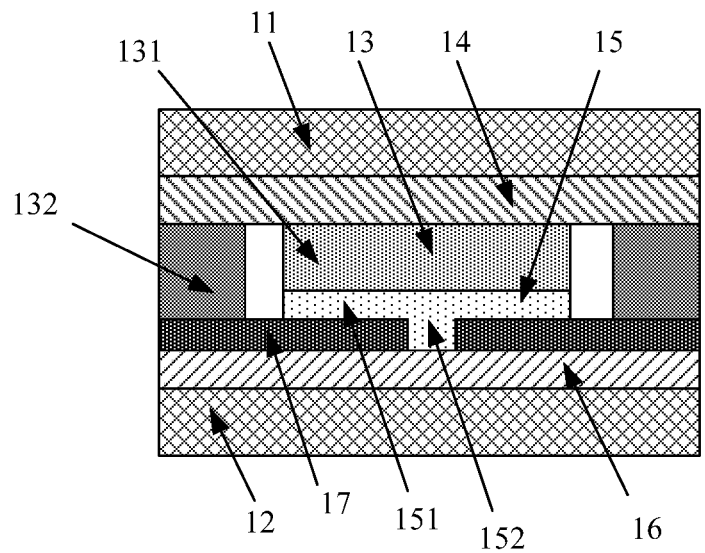
FIG. 3 illustrates a schematic structural diagram of another optical panel according to some other embodiments of the present disclosure.

FIG. 3 illustrates a schematic structural diagram of another optical panel according to some other embodiments of the present disclosure. The first transparent electrode layer 14 is a planar common electrode. The common electrode contacts both the electrochromic assembly 13 and the shielding and spacing wall 132. That is, the first transparent electrode layer 14 is used as the common electrode for all the electrochromic pixel-units 131 and contacts all the electrochromic pixel-units 131. FIG. 3 merely shows one of the electrochromic pixel-unit 131.

The first transparent electrode layer 14 may include an ITO layer. The first transparent electrode layer 14 may be formed directly on a surface of the first transparent substrate 11 by sputtering. Opposite sides of the first transparent substrate 11 and the second substrate 12 may be fitted and fixed through glue layers. The first transparent electrode layer 14 is formed on the first transparent substrate 11. The second transparent electrode layer 15, the shielding and spacing wall 132, and the electrochromic assembly 13 are formed on the second transparent substrate 12. Forming the optical panel includes forming the first transparent electrode layer 14 on the first transparent substrate 11, forming the second transparent electrode layer 15, the shielding and spacing wall 132, and the electrochromic assembly 13 sequentially on the second transparent substrate 12, and fitting the two transparent substrates.

The common electrode also electrically contacts the shielding and spacing wall 132 directly. That is, the shielding and spacing wall 132 and the common electrode may have a same potential and both be grounded. The first shielding and spacing wall 1321, the second shielding and spacing wall 1322, and the common electrode form a shielded space, which has a better shield function and better prevent the crosstalk between the adjacent electrochromic pixel-units 131. The first transparent electrode layer 14 may include a grounded signal line and/or the shielding and spacing wall 132 may include a grounded signal line. Thus, the shielding and spacing wall 132 and the common electrode may both be grounded simultaneously.

The second transparent electrode layer 15 includes the plurality of pixel electrodes 151 corresponding to the plurality of the electrochromic pixel-units 131 in a one-to-one correspondence. A pixel electrode 151 is arranged at a side surface of the corresponding electrochromic pixel-unit 131 away from the first transparent electrode layer 14. The pixel electrode 151 electrically contacts the electrochromic pixel-unit 131 and is insulated from the shielding and spacing wall 132. Each of the plurality of pixel electrodes 151 may correspond to an electrochromic pixel-unit 131. Each pixel area includes a pixel electrode 151. The electrochromic pixel-unit 131 may be arranged at a surface of the pixel electrode 151.

As shown in FIG. 3, the pixel electrode 151 is connected to the transparent electrode wire 16, which may be configured to provide the driving voltage to the pixel electrode 151. The transparent electrode wire 16 is located on a side of the pixel electrode 151 away from the electrochromic pixel-unit 131. A transparent insulation layer 17 is between the transparent electrode wire 16 and the pixel electrode 151, which are electrically connected through a through-hole 152. The transparent electrode wire 16 may be used as a scanning line of the electrochromic pixel-unit 131 and drive the electrochromic pixel-unit 131 to perform electrochromic to adjust the optical parameter.

The transparent electrode wires 16 may correspond to the pixel electrodes 151 in a one-to-one correspondence. The transparent electrode wires 16 may be wired by ITO. As shown in FIG. 3, all the transparent electrode wires 16 are on a same layer. The transparent electrode wires 16 may be formed by evaporation directly on the second transparent substrate 12 through a mask. In some other embodiments, the transparent electrode wires 16 may be formed by evaporation on the second transparent substrate 12 through coating and etching.

Figure 4:
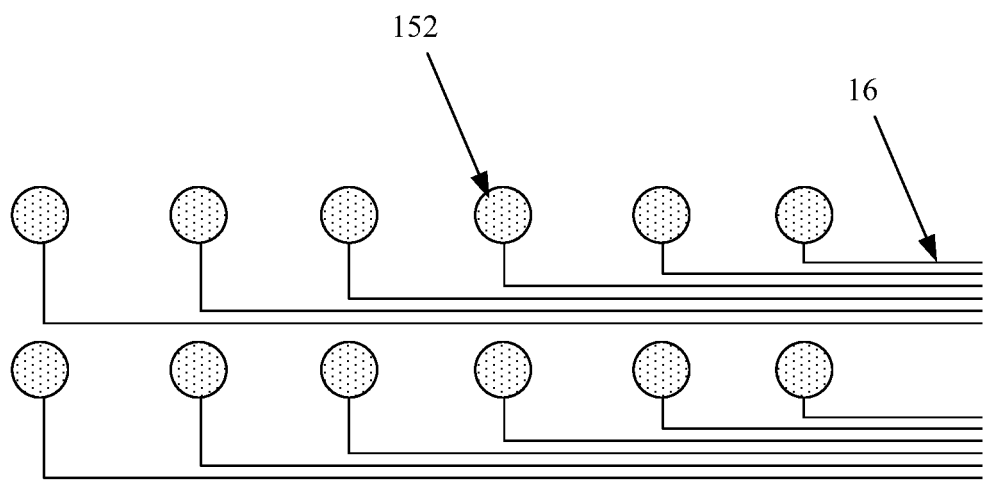
FIG. 4 illustrates a schematic top view of a transparent electrode wire of the optical panel shown in FIG. 3.

FIG. 4 illustrates a schematic top view of a transparent electrode wire of the optical panel shown in FIG. 3. All the transparent electrode wires 16 are on the same layer. All the transparent electrode wires 16 are parallel to each other. Thus, the transparent electrode wires 16 may are connected to an external circuit on a same side of the optical panel.

Figure 5:
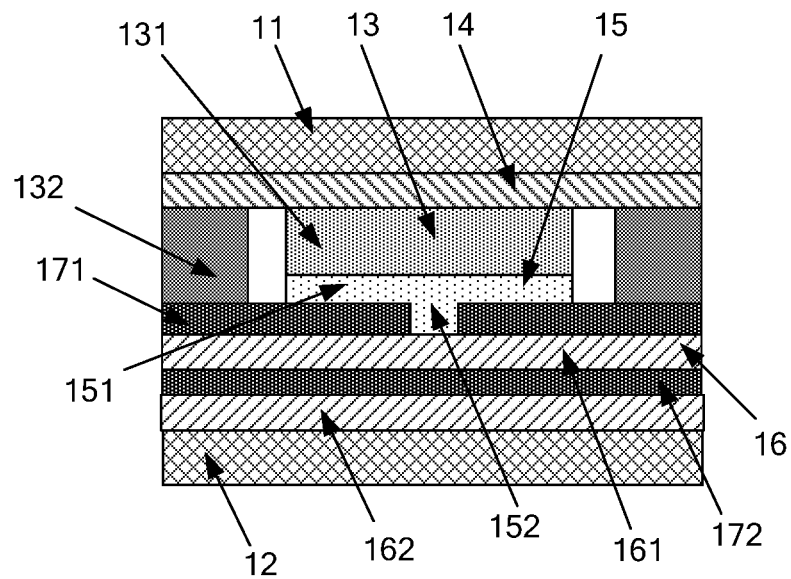
FIG. 5 illustrates a schematic structural diagram of another optical panel according to some other embodiments of the present disclosure.

FIG. 5 illustrates a schematic structural diagram of another optical panel according to some other embodiments of the present disclosure. As shown in FIG. 5, the transparent electrode wire 16 includes a first electrode wire 161 located on a first wiring layer and a second electrode wire 162 located on a second wiring layer. The first wiring layer 161 is located between the second wiring layer 162 and the electrochromic assembly 13. A first transparent insulation layer 171 is arranged between the first wiring layer 161 and the electrochromic assembly 13. A second transparent insulation layer 172 is arranged between the first wiring layer 161 and the second wiring layer 162. The transparent electrode wires 16 are divided into two parts. One portion of the transparent electrode wires 16 is on a same layer and located on the first wiring layer 161. The other portion of the transparent electrode wires 16 is on a same layer and located on the second wiring layer 162.

Figure 6:
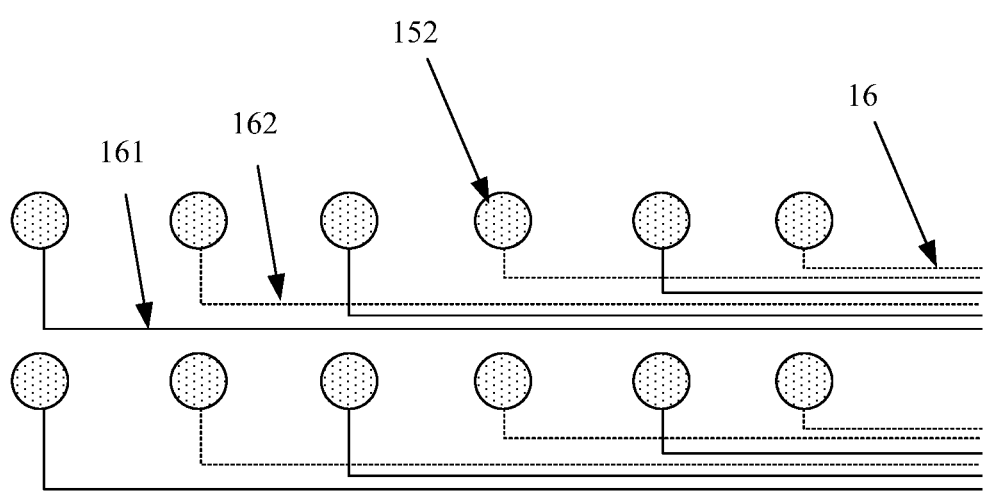
FIG. 6 illustrates a schematic top view of a transparent electrode wire of the optical panel shown in FIG. 5.

FIG. 6 illustrates a schematic top view of a transparent electrode wire of the optical panel shown in FIG. 5. As shown in FIG. 6, since the transparent electrode wires 16 are arranged in the two layers, sufficient space may be configured to arrange the transparent electrode wires 16. Thus, difficulty of a preparation process may be reduced, and the transparent electrode wires 16 with wider widths may be prepared. As such, resistance may be reduced to reduce energy consumption and increase response speed.

Figure 7:
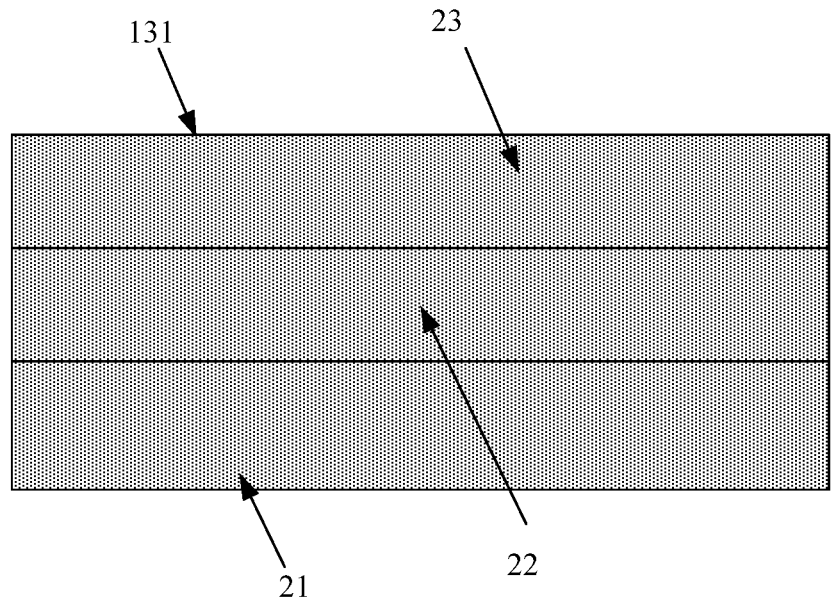
FIG. 7 illustrates a schematic structural diagram of an electrochromic pixel-unit according to some other embodiments of the present disclosure.

FIG. 7 illustrates a schematic structural diagram of an electrochromic pixel-unit according to some other embodiments of the present disclosure. The electrochromic pixel-unit 131 includes an electrochromic layer 21, an electrolyte layer 22, and an ion storage layer 23 arranged sequentially. The electrochromic layer 21 may be arranged toward the first transparent substrate 11. The ion storage layer 23 may be arranged toward the second transparent substrate 12. The electrochromic pixel-unit 131 may perform electrochromic under the electrical field provided by the first transparent electrode layer 14 and the second transparent electrode layer 15 to change color and/or transparency to adapt to different imaging requirements. In some other embodiments, the electrochromic pixel-unit 131 may include a birefringent liquid crystal layer that can change the transparency based on the voltage.

In some embodiments, the transparent conductive members including ITO are described as an example. However, the transparent conductive members may include another transparent material, such as a transparent metal film or another transparent conductive metal oxide.

Figure 8:
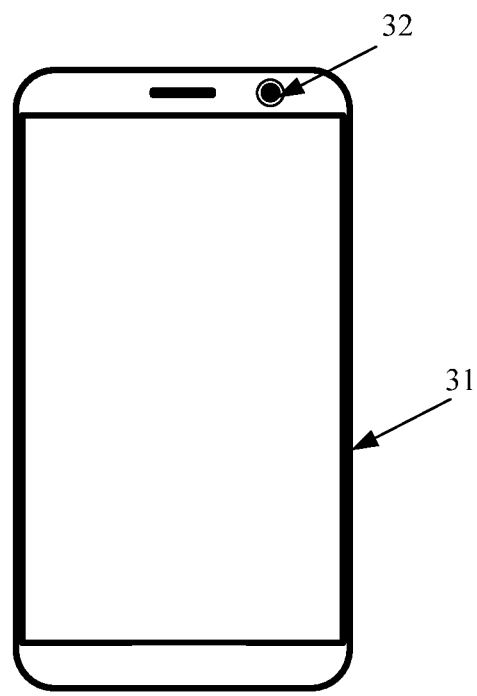
FIG. 8 illustrates a schematic structural diagram of an image collection apparatus according to some other embodiments of the present disclosure.

Embodiments of the present disclosure further provide an image collection apparatus. FIG. 8 illustrates a schematic structural diagram of the image collection apparatus according to some other embodiments of the present disclosure. The image collection apparatus includes a camera module 32, an optical panel, and a processor (not shown in FIG. 8). The optical panel is arranged on a light incident side of the camera module 32. The optical panel includes the optical panel described above. The processor may be configured to provide the driving voltage for the optical panel and control the camera module to perform photosensitive imaging.

The image collection apparatus may include but is not limited to a cell phone, a tablet, and a smart wearable apparatus. The camera module 32 may include a front camera or a rear camera. The optical panel and the camera module 32 may be packaged integrally. The optical panel may be used as the cover panel of the camera module 32. A cover panel may not need to be arranged separately for the camera module 32.

The image collection apparatus may include a housing and a display screen located in the housing. The processor may be packaged inside the housing. The processor may be configured to control the display screen to display an image.

The processor may be configured to provide a first driving voltage for the optical panel, collect a first image through the camera module, divide the first image into a plurality of image regions, provide a second driving voltage for the optical panel based on a brightness level of the image regions, and obtain a second image through the camera module. The first driving voltage may cause all the electrochromic pixel-units of the optical panel to have a largest light transmittance. The second driving voltage may cause a light transmittance of an electrochromic pixel-unit to be negatively correlated to a brightness level of an image region. That is, the light transmittance of the electrochromic pixel-unit, which corresponds to the image region with a higher brightness level, may be lower. The light transmittance of the electrochromic pixel-unit, which corresponds to the image region with a lower brightness level, may be higher. Thus, the imaging brightness is uniform, and the imaging quality is good.

In some other embodiments, the processor may be configured to control the light transmittance of the electrochromic pixel-unit to be positively correlated to the brightness level of the image region to increase image sensitivity and contrast.

In some other embodiments, the processor may be configured to generate a driving voltage based on color difference information of the image region and control the color of the electrochromic pixel-unit to be same as the color information of the corresponding image region to compensate for the color information. For example, an image of green plants may be greener, and an image of blue sky may be bluer.

The image collection apparatus of embodiments of the present disclosure may control the electrochromic of the optical panel in the camera module by the processor to adapt to different imaging requirements and collect a variety of images. The image collection apparatus may also realize the real adjustment of the incident light through the hardware structure to achieve a more realistic imaging effect. The imaging quality may be good, and the structure of the optical panel may be simple. Thus, the optical panel may be prepared by a low-cost process with a low cost.

Figure 9:
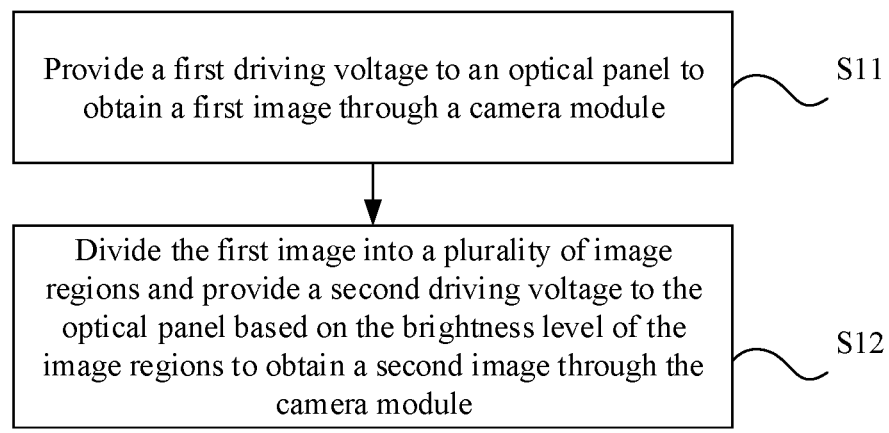
FIG. 9 illustrates a schematic flowchart of an image collection method according to some other embodiments of the present disclosure.

Embodiments of the present disclosure further provide an image collection method of the image collection apparatus. FIG. 9 illustrates a schematic flowchart of the image collection method according to some other embodiments of the present disclosure. The method includes obtaining the first image through the camera module by providing the first driving voltage to the optical panel (S11), and dividing the first image into the plurality of image regions, and providing a second driving voltage to the optical panel based on the brightness level of the image regions to obtain the second image through the camera module (S12).

The first driving voltage may cause all the electrochromic pixel-units of the optical panel to have the largest light transmittance. The second driving voltage may cause the light transmittance of the electrochromic pixel-unit to be negatively correlated to the brightness level of the image region.

The image collection process is further described as follows.

First, the processor may be configured to adjust the electrochromic assembly of the optical panel in the camera module to be in a transparent status. That is, the first driving voltage may cause all the electrochromic pixel-units to have the largest light transmittance.

Then, the processor may be configured to obtain the first image by the camera module collecting the image. The image may include an image having RGB color information collected by the photosensitive chip of the camera module.

After extracting the brightness level of the first image, the processor may obtain the brightness level of different image regions in the first image. For example, the first image may be divided into a number M*N of image regions, which correspond to a number M*N of pieces of brightness level. Each image region corresponds to an electrochromic pixel-unit in the optical panel. Based on the brightness level of the image region, the driving voltage of the electrochromic pixel-unit corresponding to the image region may be set. Based on the driving voltage, the processor may be configured to control the electrochromic pixel-unit to perform the electrochromic and control the camera module to collect the second image.

The image collection method of embodiments of the present disclosure includes controlling the incident light based on the electrochromic assembly of the optical panel in the camera module to realize the variety of image collections to improve the imaging quality.

Embodiments of the present disclosure are described in a progressive, or parallel, or progressive and parallel combination. Each embodiment focuses on the differences from other embodiments, and the same and similar parts between various embodiments may refer to each other. The image collection apparatus and method of embodiments of the present disclosure correspond to the optical panel of embodiments of the present disclosure. Thus, the description is relatively simple. For related parts, reference may be made to the description of the corresponding part of the optical panel.

In the description of the present disclosure, orientations or position relationship indicated by the terms "upper," "lower," "top," "bottom," "inner," and "outer" are based on the orientations or positional relationship shown in the accompanying drawings, which is only for the convenience of describing the application and simplifying the description, and does not indicate or imply that the device or element referred to must have a specific orientation, be constructed and operated in a specific orientation, and therefore cannot be understood as a restriction of the present disclosure. When an assembly is considered to be "connected" to another assembly, the assembly may be directly connected to another assembly, or an assembly centrally located may exist simultaneously.

In this specification, relational terms such as first and second are only used to distinguish one entity or operation from another entity or operation and do not necessarily require or imply any such actual relationship or order between these entities or operations. Moreover, the terms "including," "containing," or any other variations thereof are intended to cover non-exclusive inclusion, so that an item or a device including a series of elements includes not only those elements, but also other elements that are not explicitly listed, or elements inherent to such items or device. If there are no more restrictions, the element defined by the sentence "including a . . . " does not exclude the existence of another same element in the item or device that includes the above elements.

The description of embodiments of the present disclosure enables those skilled in the art to implement or use the present disclosure. Various modifications to these embodiments are obvious to those skilled in the art. The general principles defined in the specification may be implemented in other embodiments without departing from the spirit or scope of the present disclosure. Therefore, the present disclosure will not be limited to embodiments shown in the specification but should conform to the widest scope consistent with the principles and novel features disclosed in the present disclosure.

What is claimed is:

1. An optical panel, comprising:
   a first transparent substrate;
   a second transparent substrate arranged opposite the first transparent substrate;
   an electrochromic assembly located between the first transparent substrate and the second transparent substrate and including a plurality of electrochromic pixel-units that are arranged in an array, a shielding and spacing wall being arranged between two adjacent of the plurality of electrochromic pixel-units;
   a first transparent electrode layer arranged between the electrochromic assembly and the first transparent substrate;
   a second transparent electrode layer, arranged between the electrochromic assembly and the second transparent substrate, includes a plurality of pixel electrodes corresponding to the plurality of electrochromic pixel-units, each pixel electrode being arranged on a side surface of a corresponding electrochromic pixel-unit away from the first transparent electrode layer, electrically contacting the electrochromic pixel-unit, and being insulated from the shielding and spacing wall; and
   a plurality of transparent electrode wires including first transparent electrode wires located on a first wiring layer and second transparent electrode wires located on a second wiring layer, the first wiring layer is located between the second wiring layer and the electrochromic assembly,
   wherein the first transparent electrode layer and the second transparent electrode layer are configured to provide a first driving voltage to the plurality of electrochromic pixel-units and collect a first image with a plurality of image regions by scanning along the plurality of transparent electrode wires as scanning lines, determine brightness levels of each of the plurality of image regions, and provide a second driving voltage causing the light transmittance of the plurality of electrochromic pixel-units to be negatively correlated to the brightness level of the plurality of image regions.

2. The optical panel of claim 1, wherein:
   the shielding and spacing wall includes a transparent conductive layer;
   the transparent conductive layer includes a plurality of first shielding and spacing walls arranged parallelly and a plurality of second shielding and spacing walls arranged parallelly;
   the plurality of first shielding and spacing walls intersect with the plurality of second shielding and spacing walls to form a plurality of image regions, each image region corresponding to an electrochromic pixel-unit, and each image region being located in the electrochromic pixel-unit.

3. The optical panel of claim 2, wherein:
   the plurality of first shielding and spacing walls and the plurality of second shielding and spacing walls are located on a same transparent conductive layer and are electrically connected at an intersection position; and
   the transparent conductive layer is grounded.

4. The optical panel of claim 1, wherein:
   the first transparent electrode layer is a planar common electrode;
   the common electrode of the first transparent electrode layer electrically contacts both of the electrochromic assembly and the shielding and spacing wall.

5. The optical panel of claim 4, wherein:
   each pixel electrode is connected to a transparent electrode wire configured to provide a driving voltage for each pixel electrode;
   the transparent electrode wire is located on a side of each pixel electrode away from the electrochromic pixel-unit; and
   a transparent insulation layer is arranged between the transparent electrode wire and each pixel electrode, which are electrically connected through a through-hole.

6. The optical panel of claim 5, wherein:
   a first transparent insulation layer is arranged between the first wiring layer and the electrochromic assembly; and
   a second transparent insulation layer is arranged between the first wiring layer and the second wiring layer.

7. The optical panel of claim 1, wherein each of the plurality of electrochromic pixel-units includes an electrochromic layer, an electrolyte layer, and an ion storage layer arranged sequentially.

8. An image collection apparatus, comprising:
   a camera module;
   an optical panel arranged on a light incident side of the camera module and including:
      a first transparent substrate;
      a second transparent substrate arranged opposite the first transparent substrate;
      an electrochromic assembly located between the first transparent substrate and the second transparent substrate and including a plurality of electrochromic pixel-units that are arranged in an array, a shielding and spacing wall being arranged between two adjacent of the plurality of electrochromic pixel-units;
      a first transparent electrode layer arranged between the electrochromic assembly and the first transparent substrate;
      a second transparent electrode layer arranged between the electrochromic assembly and the second transparent substrate, includes a plurality of pixel electrodes corresponding to the plurality of electrochromic pixel-units, each pixel electrode being arranged on a side surface of a corresponding electrochromic pixel-unit away from the first transparent electrode layer, electrically contacting the electrochromic pixel-unit, and being insulated from the shielding and spacing wall;
      a plurality of transparent electrode wires including first transparent electrode wires located on a first wiring layer and second transparent electrode wires located on a second wiring layer, the first wiring layer is located between the second wiring layer and the electrochromic assembly, and a processor configured for the optical panel and control the camera module to perform photosensitive imaging by providing a first driving voltage to the plurality of electrochromic pixel-units, collecting a first image with a plurality of image regions by scanning along the plurality of transparent electrode wires as scanning lines, determine brightness levels of each of the plurality of image regions, and providing a second driving voltage causing the light transmittance of the plurality of electrochromic pixel-units to be negatively correlated to the brightness level of the plurality of image regions.

9. The apparatus of claim 8, wherein:
the shielding and spacing wall includes a transparent conductive layer;
the transparent conductive layer includes a plurality of first shielding and spacing walls arranged parallelly and a plurality of second shielding and spacing walls arranged parallelly;
the plurality of first shielding and spacing walls intersection with the plurality of second shielding and spacing walls to form a plurality of image regions, each image region corresponding to an electrochromic pixel-unit, and each image region being located in the electrochromic pixel-unit.

10. The apparatus of claim 9, wherein:
the plurality of first shielding and spacing walls and the plurality of second shielding and spacing walls are located on a same transparent conductive layer and are electrically connected at an intersection position; and
the transparent conductive layer is grounded.

11. The apparatus of claim 8, wherein:
the first transparent electrode layer is a planar common electrode;
the common electrode electrically contacts both of the electrochromic assembly and the shielding and spacing wall.

12. The apparatus of claim 11, wherein:
each pixel electrode is connected to a transparent electrode wire configured to provide a driving voltage for each pixel electrode;
the transparent electrode wire is located on a side of each pixel electrode away from the electrochromic pixel-unit; and
a transparent insulation layer is arranged between the transparent electrode wire and each pixel electrode, which are electrically connected through a through-hole.

13. The apparatus of claim 12, wherein:
a first transparent insulation layer is arranged between the first wiring layer and the electrochromic assembly; and
a second transparent insulation layer is arranged between the first wiring layer and the second wiring layer.

14. The apparatus of claim 8, wherein each of the plurality of electrochromic pixel-units includes an electrochromic layer, an electrolyte layer, and an ion storage layer arranged sequentially.

15. The apparatus of claim 8, wherein the processor is further configured to:
provide the first driving voltage for the optical panel to collect a first image through the camera module, the first driving voltage causing all the plurality of electrochromic pixel-units of the optical panel to have a largest light transmittance; and
divide the first image into a plurality of image regions.

16. An image collection method, comprising:
providing a first transparent substrate;
providing a second transparent substrate arranged opposite the first transparent substrate;
providing an electrochromic assembly located between the first transparent substrate and the second transparent substrate and including a plurality of electrochromic pixel-units that are arranged in an array, a shielding and spacing wall being arranged between two adjacent of the plurality of electrochromic pixel-units;
providing a first transparent electrode layer, being a planar common electrode, arranged between the electrochromic assembly and the first transparent substrate;
providing a second transparent electrode layer, arranged between the electrochromic assembly and the second transparent substrate, includes a plurality of pixel electrodes corresponding to the plurality of electrochromic pixel-units, each pixel electrode being arranged on a side surface of a corresponding electrochromic pixel-unit away from the first transparent electrode layer, electrically contacting the electrochromic pixel-unit, and being insulated from the shielding and spacing wall; and
providing a plurality of transparent electrode wires including first transparent electrode wires located on a first wiring layer and second transparent electrode wires located on a second wiring layer, the first wiring layer is located between the second wiring layer and the electrochromic assembly,
wherein the first transparent electrode layer and the second transparent electrode layer are configured to
provide a first driving voltage to an optical panel to obtain a first image through a camera module, the first driving voltage causing all electrochromic pixel-units of the optical panel to have a largest light transmittance;
divide the first image into a plurality of image regions; and
provide a second driving voltage to the optical panel to obtain a second image through the camera module, the second driving voltage causing the light transmittance of the electrochromic pixel-units to be negatively correlated to the brightness level of the plurality of image regions.

* * * * *